Figure 1:
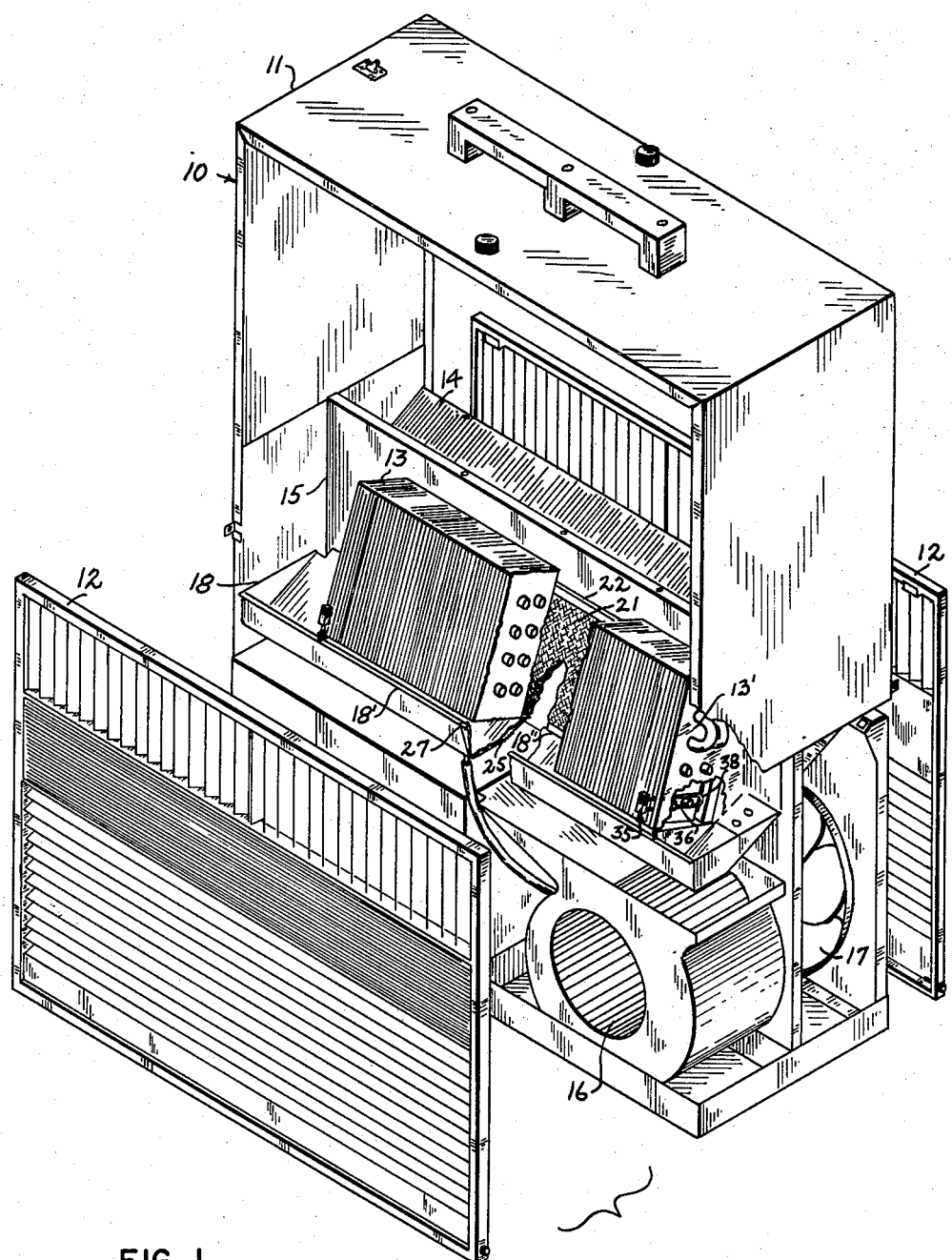

INVENTOR.
Howard James Tyler
BY Herman Seid
Atty.

July 19, 1960 H. J. TYLER 2,945,360
AIR CONDITIONING UNITS INCLUDING FILTER MOUNTING MEANS
Filed Sept. 22, 1958 2 Sheets-Sheet 2

INVENTOR.
Howard James Tyler
BY Herman Seid
atty

United States Patent Office 2,945,360
Patented July 19, 1960

2,945,360

AIR CONDITIONING UNITS INCLUDING FILTER MOUNTING MEANS

Howard James Tyler, Salina, N.Y., assignor to Carrier Corporation, Syracuse, N.Y., a corporation of Delaware Filed Sept. 22, 1958, Ser. No. 762,326

13 Claims. (Cl. 62—317)

This invention relates to air conditioning, more particularly, to means for filtering the air to remove any foreign particles therefrom, and to prevent undesirable dirt accumulations on the cooling evaporator coils of an air conditioning apparatus.

Where air conditioning apparatus comprising a cooling evaporator coil arranged in heat exchange relationship with the air in the conditioned area, is employed, it is generally found that the passage of air over the cooling evaporator coils results in a residue of foreign matter being deposited upon the surface of said coils thereby serving to diminish the effectiveness of heat transfer through the walls of the evaporator. The deposition of foreign matter upon the evaporator surface is attributable to the condensation of moisture from the conditioned air, with said moisture tending to condense about any dirt particles as a nucleus causing the dirt particles to drop with the condensate. Where fins are employed, as is conventionally the case, to extend the effective heat transfer area of the coils, the spacing between fins is generally sufficiently small so that clogging of the fins is a fairly common occurrence. It thus becomes desirable to provide a filter arrangement in the conditioned air stream to clean the air prior to contact of the air with the cooling evaporator coil.

In the provision of relatively compact unit air conditioners, as in all air handling apparatus, it is desirable to provide maximum capacity equipment in a minimum volume. The provision of a filter should accordingly require little or no additional space and of course offer minimal interference with air flow through the unit. Additionally since filters must periodically be removed for cleaning, or replacement, they must be so positioned in the unit so as to provide ready access. In conventional air conditioning units, a variety of difficulties are encountered in the positioning of the filter element, since this filter element should be placed as close to the cooling coil as possible so as to insure the presence of clean air passing over the coil.

It is with these, and other problems in mind, that this invention has been evolved. The herein disclosed invention relates to the provision of a novel filter element for use in an air conditioning apparatus, with said filter being positionable immediately adjacent the cooling evaporator coil at the entry face of said coil whereby the conditioned air stream may be cleansed prior to passing over said coil to thus eliminate the possibility of any dirt particles collecting upon said coil. The novel filter arrangement further permits ready removal of the filter for cleaning and/or replacement, and occupies a minimal volume. The novel filter arrangement may be employed to clean an air stream prior to passage into contact with any variety of heat exchanger.

It is accordingly a primary object of this invention to provide a novel filter arrangement for use in air conditioning equipment.

Another object of this invention is to provide an improved mounting structure for filters.

A still further object of the invention is to provide a novel filter arrangement for use in air conditioning systems with said filter arrangement, occupying a minimal volume.

It is also an object of this invention to provide a novel arrangement for a filter in combination with an air conditioning unit, whereby said filter may be readily removed for cleaning and maintenance.

A further object of this invention is to provide a filter arrangement for use in air conditioning units permitting mounting of the filter in close proximity to the entry surface of the cooling coils.

An additional important object of the invention is to provide a simple, inexpensive, readily maintainable filter arrangement for use in unit air conditioners providing a compact structure.

These and other objects of the invention which will become apparent from the following description and claims, are achieved by provision of mounting members and abutment means adjacent the cooling element of an air conditioning refrigeration system. Attached to the mounting members are guide channels within which a filter may slide. A spring member biases the filter against the cooling element and the abutment member. A releasing or ejecting plunger is provided for urging the filter in a direction opposed to the forces exerted by the spring out of engagement with the abutment whereby the biasing spring will cause said filter to be ejected.

A primary feature of the invention resides in the novel mounting for a filter in conjunction with the cooling element of an air conditioning system permitting removal of the filter by manual depression of a releasing plunger.

Another important feature of the invention is that the filter may be mounted immediately adjacent the entry surface of a cooling element to insure the cleaning of the conditioned air stream prior to passage over the cooling element.

An additional feature of the invention resides in the provision of overcenter acting spring biasing means maintaining the filter against the cooling element in one orientation of the spring and ejecting the filter in another spring orientation.

A further feature of the invention resides in the provision of a novel releasing plunger for causing filter ejection.

Figure 2:
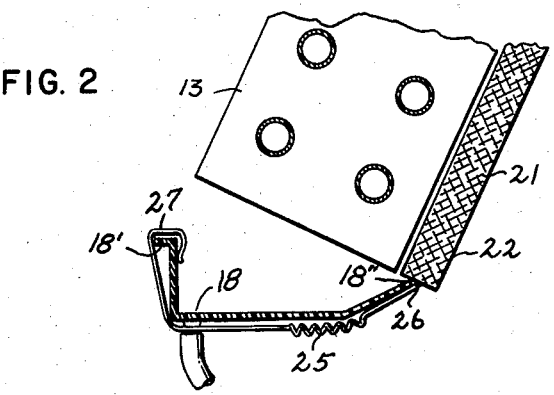
Figure 3:
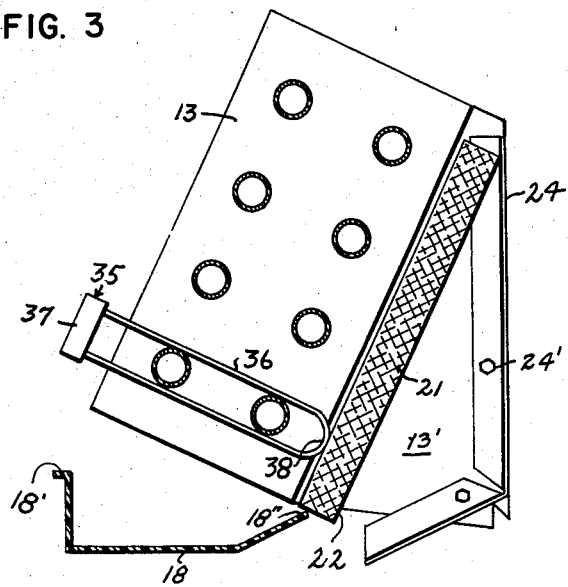

The specific details of a preferred embodiment of the invention, and their mode of functioning will be made most manifest and particularly pointed out in conjunction with the accompanying drawings, wherein:

Figure 1 represents a perspective view with parts broken away, and the casing exploded of a unit air conditioner in which the novel filter arrangement is embodied; and Figure 2 is a cross-sectional view through the filter and evaporator cooling coil of Figure 1 illustrating how the filter is maintained in operative position by the spring member; and Figure 3 is a cross sectional view similar to Figure 2 illustrating the release plungers and the mounting guide plates.

Referring now more particularly to the drawings, like numerals in the various figures will be taken to designate like parts.

As best seen in Figure 1, the novel filtering means are illustrated as embodied in combination with a unit air conditioner 10 having a casing 11 and removable facade grills 12, said casing 11 and facade grills 12 being shown in exploded position to reveal the components of said unit.

Unit 10 includes a cooling evaporator 13 disposed at an angle in the upper part of the unit and a heat dissipating condenser 14, mounted on opposite sides of a partition panel 15. An evaporator air stream is set up by evaporator fan 16 provided beneath the evaporator 13 for directing air upwardly against the entry face of evaporator 13 (rearward face of the tilted evaporator) from the conditioned area, when the unit is employed for cooling purposes. Condenser fan 17 on the opposite side of partition panel 15 directs outside air into heat exchange relationship with the condenser, when the unit is employed for cooling.

In the arrangement illustrated, a condensate collection trough 18 including a front lip 18' and a rear edge 18" is arranged beneath evaporator 13 at a spaced distance from partition panel 15 so as not to interfere with the passage of air from fan 16 to evaporator 13.

The novel filtering arrangement permitting filtering of the air stream prior to passage through the heat exchange element is here shown as applied to evaporator 13 of the unit 10, where said unit is employed for cooling purposes. The filtering arrangement includes a filter 21 of a conventional shape, formed of any suitable filtering material such as glass-wool, or the like suitably framed by framing 22. In the instant construction the filter 21 is shown of a rectangular configuration so as to substantially cover the entry surface of evaporator 13. The filter mounting means or means for supporting the filter may comprise the evaporator tube sheets or support plates 13' which have guide means or channels 24 secured thereto by suitable securing means, as for example, bolts 24' to support the filter. An overcenter acting biasing spring 25 is provided having a filter hook 26 at one end, adapted for engagement with the frame 22 of the filter, and a hook 27 at the other end adapted for engagement with lip 18' of the condensate pan 18, by hooking thereover. The rear edge 18" of pan 18 extends along the bottom of the air entry surface of the heat exchange unit, in this case evaporator 13, so that the filter abuts thereagainst. If desired, a fixed detent may be provided beneath condensate pan 18 to receive hook 27 rather than hooking the hook over lip 18' thereof.

Ejecting means including releasing plunger 35 as best seen in Figure 3 are provided on the heat exchanger. The plunger 35 comprises a U-shaped member 36 slidably mounted with respect to the heat exchanger. This is most readily accomplished with conventional heat exchangers which are formed of return bend conduits having fins extending the heat transfer area thereof. As seen in the drawing, U-shaped member 36 is slidably arranged for movement on two or more of said return bends. The free ends of the U-shaped member are provided with a button 37, and the nose 38 of the member 36 extends beyond the entry face of the heat exchanger into contact with filter 21.

The aforedisclosed novel filtering arrangement may be employed in conjunction with a wide variety of heat exchangers to clean any fluid stream directed into heat exchange relationship therewith. More specifically the novel inventive concept has here been illustrated in conjunction with a unit air conditioner employed for cooling purposes, commonly referred to as a room cooler. In this situation, air from the conditoned area is directed into heat exchange relationship with the evaporator by means of evaporator fan 16.

It is desirable to filter this air before it reaches the evaporator to prevent dirt from accumulating on and clogging the fins of the evaporator. To this end filter 21 having a surface area at least equal to the entry surface area of the evaporator 13 is provided. Filter hook 26 of spring 25 is engaged with the frame of filter 21. Filter 21 is then slid into guide channels 24 over the entry face of the evaporator and the hook 27 of spring 25 is engaged with lip 18' of pan 18 to bias the filter into engagement with rear edge 18" of pan 18.

It will be observed that spring 25 functions in an overcenter fashion so that with hooks 26 and 27 engaged respectively one on filter framing 22, and the other on lip 18', the filter is held in operative position over the entry surface of evaporator 13 abutting rear edge 18" of pan 18, spring 25 serving to bias the filter into this operative position.

Thereafter when the filter becomes clogged, or requires removal for other maintenance purposes, this is accomplished by pressing button 37 of releasing plunger 35 to force nose 38 of plunger 35 against the filter thereby releasing the filter from its engagement against rear edge 18" of pan 18. Upon release of the filter from such engagement, spring 25 serves to pull filter 21 downwardly away from the entry face of evaporator 13, permitting subsequent removal and servicing of the filter.

It is thus seen that a novel filtering arrangement has been provided permitting the mounting of a filter over a normally inaccessible entry surface of a heat exchanger, so as to filter the air entering into heat exchange relationship with said exchanger, at the air entry surface of said exchanger. The novel filtering arrangement permits ready positioning of a filter, and securement of said filter in operative position over the entry surface of the heat exchanger. Removal of the filter for maintenance and/or replacement is readily accomplished by means of a novel releasing plunger.

The above disclosure has been given by way of illustration and elucidation and not by way of limitation and it is desired to protect all embodiments of the hereindisclosed inventive concept within the scope of the appended claims.

I claim:

1. A filtering arrangement for filtering an air stream prior to its passage through a heat exchange element including return bend conduits having spaced fins thereon extending the effective heat transfer surface of the conduits, said arrangement comprising filter mounting means; a filter; filter guide means secured on said mounting means and supporting and orienting the filter in position over the air entry surface of the heat exchange element; and releasing means extending between the fins of the heat exchange element for selectively releasing the filter.

2. A filtering arrangement as in claim 1 in which said filter mounting means comprise a portion of the heat exchange element.

3. A filtering arrangement as in claim 2 in which said guide means comprise channels attached to said portion of the heat exchange element.

4. A filtering arrangement as in claim 1 in which said releasing means comprise a plunger including a U-shaped member, the legs of which extend over one of the conduits to slide thereover; and a button on said U-shaped member.

5. A filtering arrangement for filtering an air stream prior to its passage through a heat exchange element including return bend conduits having spaced fins thereon extending the effective heat transfer surface of the conduits, said arrangement comprising filter mounting plates arranged at each side of the heat exchange element having guide channels to receive a filter; a filter supported by said guide channels; said guide channels receiving said filter and orienting same over the air entry surface of the heat exchange element; abutment means below said heat exchanger against which said filter is engaged; and an ejecting plunger extending between the fins of the heat exchange element for selectively moving said filter from said abutment means.

6. A filtering arrangement as in claim 5 in which a condensate pan is arranged beneath the heat exchange element and the abutment means comprise the rear edge of the condensate pan disposed along one edge of the air entry surface of the heat exchange element.

7. A filtering arrangement for filtering an air stream prior to its passage through a heat exchange element including return bend conduits having spaced fins thereon extending the effective heat transfer surface of the conduits, said arrangement comprising filter mounting means;

a filter, filter guide means on said mounting means supporting and orienting the filter in position over the air entry surface of the heat exchange element; abutment means below said heat exchange element against which said filter will bear in operative position; overcenter acting biasing means coupled to said filter to bias same into operative position in one orientation of said biasing means; and releasing means supported on the heat exchange element to orient said biasing means and said filter so that the filter will be moved from said abutment means and moved from operative position over the heat exchange element by said biasing means.

8. A filtering arrangement as in claim 7 in which a condensate pan is arranged beneath the heat exchange element and said overcenter acting biasing means comprise a spring having one end secured to said filter and the other to the front lip of the condensate pan.

9. A filtering arrangement for filtering an air stream prior to its passage through a heat exchange element including return bend conduits having spaced fins thereon extending the effective heat transfer surface of the conduits and support sheets to support said conduits, said arrangement comprising; a filter, guide channels mounted on said sheets for receiving said filter and orienting same over the air entry surface of the heat exchange element; an abutment member below said heat exchange element against which said filter will bear in operative postion; a biasing spring coupled to said filter to bias same into operative position in one orientation of said spring; and a releasing plunger extending between the fins of the heat exchange element and bearing against the filter to move the same from said abutment member and reorient said biasing spring to move the filter out from said channels.

10. In an air conditioning unit having a heat transfer element and a fan for directing air into heat exchange relationship with the heat transfer element, means for supporting a filter in the air stream set up by the fan, said supporting means comprising mounting means adjacent the heat transfer element; and ejecting means supported by the heat transfer element whereby a filter may be releasably supported on said mounting means and ejected by said ejecting means.

11. In an air conditioning unit having a heat transfer element and a fan for directing air into heat exchange relationship with the heat transfer element, means for supporting a filter in the air stream set up by the fan, said supporting means comprising mounting means adjacent the heat transfer element; overcenter acting biasing means engaging the filter and biasing same either into or out of an operative position; and releasing means mounted adjacent the heat transfer element permitting the filter to be urged in a direction opposite the direction of the forces applied by said biasing means whereby the filter will be ejected.

12. In an air conditioning unit having a heat transfer element and a fan for directing air into heat exchange relationship with the heat transfer element, means adjacent the heat transfer element for supporting a filter in the air stream set up by the fan; overcenter acting biasing means engaging the filter and biasing same either into or out of an operative position; abutment means adjacent said heat transfer element against which the filter is engaged by said biasing means when said filter is in an operative position; and releasing means supported by the heat transfer element permitting the filter to be displaced with respect to said abutment means, whereby said biasing means will cause ejection of the filter.

13. In an air conditioning system employing a compressor, evaporator, and condenser in a fluid circuit through which refrigerant may pass, means for filtering the air passing over said evaporator, said means comprising guide means supported on said evaporator, a filter member removably arranged on said guide means; a spring biasing said filter against said evaporator; an abutment member below said evaporator between said guide means engaging said filter against the action of said spring; and a releasing plunger extending through said evaporator and forcing said filter out of engagement with said abutment member whereby the biasing spring will cause said filter to be ejected.

References Cited in the file of this patent
UNITED STATES PATENTS

| | | |
|---|---|---|
| 2,736,176 | Carlton | Feb. 8, 1956 |
| 2,763,139 | Carlton | Sept. 18, 1956 |